United States Patent [19]

Hwang

[11] Patent Number: 4,619,464
[45] Date of Patent: Oct. 28, 1986

[54] PORTABLE TYPE OF FOLDABLE LUGGAGE CART

[76] Inventor: Philip Hwang, 6A, 261 Nanking E. Rd., Sec. 3, Taipei, Taiwan

[21] Appl. No.: 736,610

[22] Filed: May 21, 1985

[51] Int. Cl.⁴ .............................................. B62B 3/02
[52] U.S. Cl. ...................................... 280/655; 16/112; 280/659; 403/61
[58] Field of Search ............... 280/654, 655, 652, 659, 280/42, 47.29; 16/112, 123; 403/382, 403, 61, 116

[56] References Cited

U.S. PATENT DOCUMENTS 3,102,648  9/1963  Hughes .............................. 280/47.29
3,861,695  1/1975  Shourek et al. ...................... 280/659
4,369,987  1/1983  Witherell ............................... 280/42

Primary Examiner—John J. Love
Assistant Examiner—Eric D. Culbreth
Attorney, Agent, or Firm—Armstrong, Nikaido, Marmelstein & Kubovcik

[57] ABSTRACT

A portable and foldable luggage cart having a pair of track rods, casters on the rods, vertical rods pivotally attached to the ends of the track rods and a handle pivotally attached to the free end of one vertical rod and attached by a slot to the other vertical rod, the pivotal attachment of the rods including a U-shaped portion having an end wall, two pins and a spring, the spring urging the end of the vertical rods into engagement with the end walls when the cart is folded and into engagement with one of the pins when the cart is unfolded.

1 Claim, 4 Drawing Figures

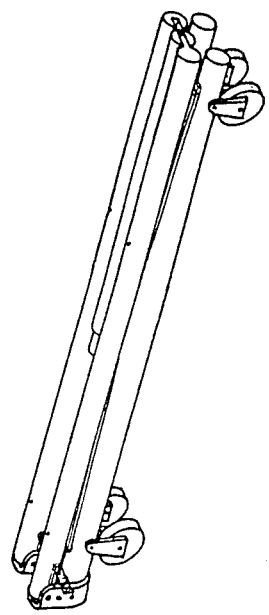
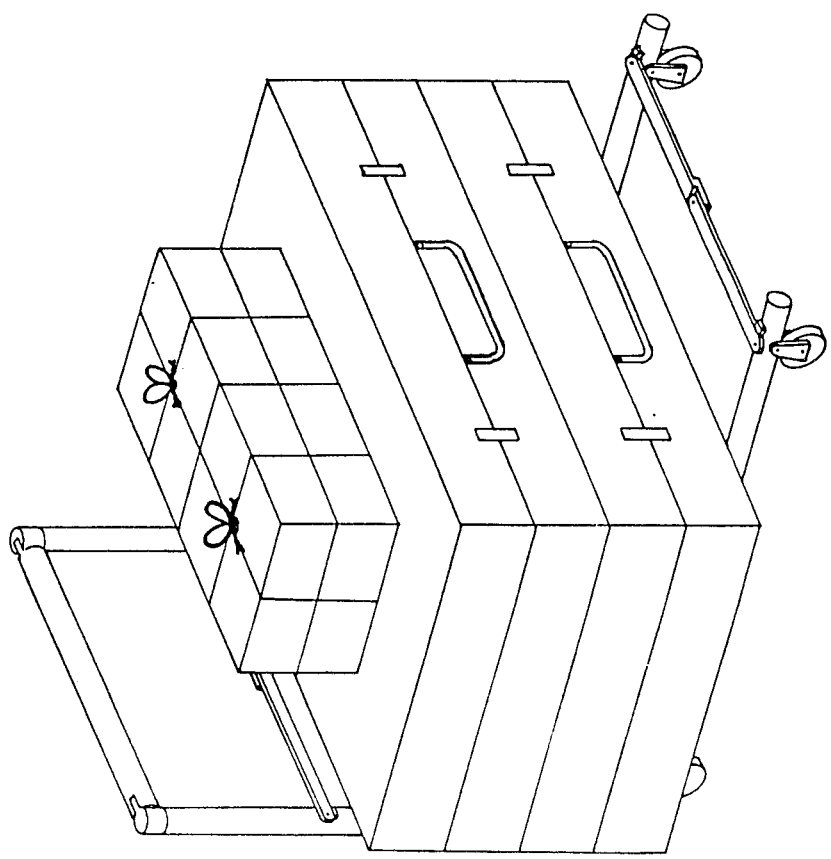
FIG. 4
FIG. 3

PORTABLE TYPE OF FOLDABLE LUGGAGE CART

SUMMARY OF THE INVENTION

This invention relates to a portable and foldable luggage cart and, more particularly, to a portable and foldable luggage cart which can be folded into a compact unit for carrying and storing the cart when the cart is not in use and which is easily unfolded and assembled when the cart is to be used.

The increase in the numbers of automobiles, trains, buses and airplane, the promotion of travel and other factors, have increased the use and handling of luggage, bags and of items purchased while traveling. One attempt to relieve the luggage handling problem has been to provide the bottom of luggage items with casters or rollers and belts by which the luggage might be pulled. Thus, rather than lifting and carrying such luggage, the luggage items provided with casters or rollers are supported on the ground by the casters or rollers and is rolled along with the belt. While such arrangement are effective where only one or two pieces of luggage are involved, where there are additional pieces of luggage or purchased items to be handled such casters or rollers are less effective.

An important purpose of the present invention is to provide a cart for luggage which can accomodate a number of pieces of luggage and purchased items and can be folded into a compact unit for handling and for storage and which can be unfolded and assembled for use in loading and moving of luggage and other items of a number, size or shape otherwise difficult to handle.

DETAILED DESCRIPTION OF THE INVENTION

In the luggage cart of the instant invention, a pair of tracks or support rods, each equipped with a pair of casters, are linked together with hinged joints so that, when the hinged joints are open, the support rods are spaced and parallel and, when the hinged joints are closed, the support rods are brought substantially close and parallel with each other. A vertical rod is connected to the end of each of the support rods, at one of the rod ends and is pivoted at the connected end to be folded down onto the support rod and to be pivoted up into a vertical or perpendicular position relative to the support rod. Like the support rods, the vertical rods are linked together with hinged joints so that, when the hinged joints are open, the vertical rods and support rods are spaced and parallel and, when the hinged joints are closed, the support rods and vertical rods are brought into substantial parallel contact. By pivoting the vertical rods at the connection to the support rods, the vertical rods and support rods are brought into substantial parallel contact. At its upper end, one of the vertical rods is provided with a projection for receiving a slot of a handle, the slotted end of the handle and the projection being interconnected with a pin. At its other end, the handle is provided with a projection for engaging in a slot at the upper end of the other vertical rod.

The invention of the instant application is more fully described and better understood from the following descriptive taken with the appended drawings of the preferred embodiment of the invention in which, FIG. 1 is a perspective view of the cart of the instant invention with the cart unfolded and erected;

FIG. 3 is a view similar to FIG. 1, but showing luggage on the cart; and

FIG. 4 is a perspective view of the folded cart.

Figure 1:
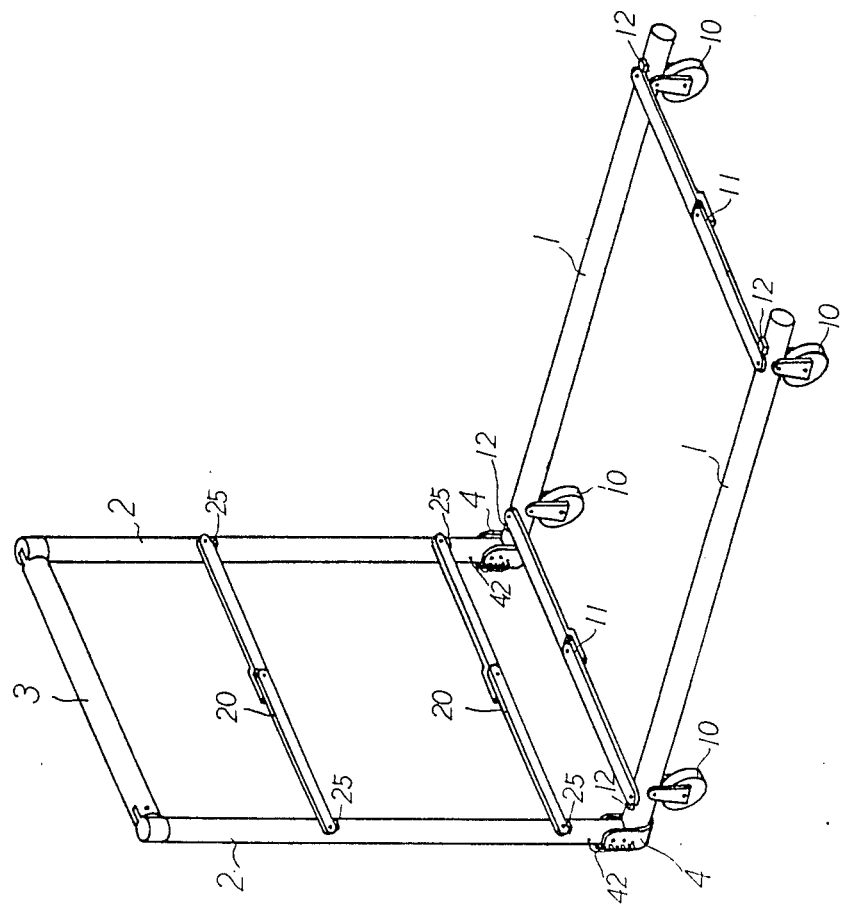
Figure 2:
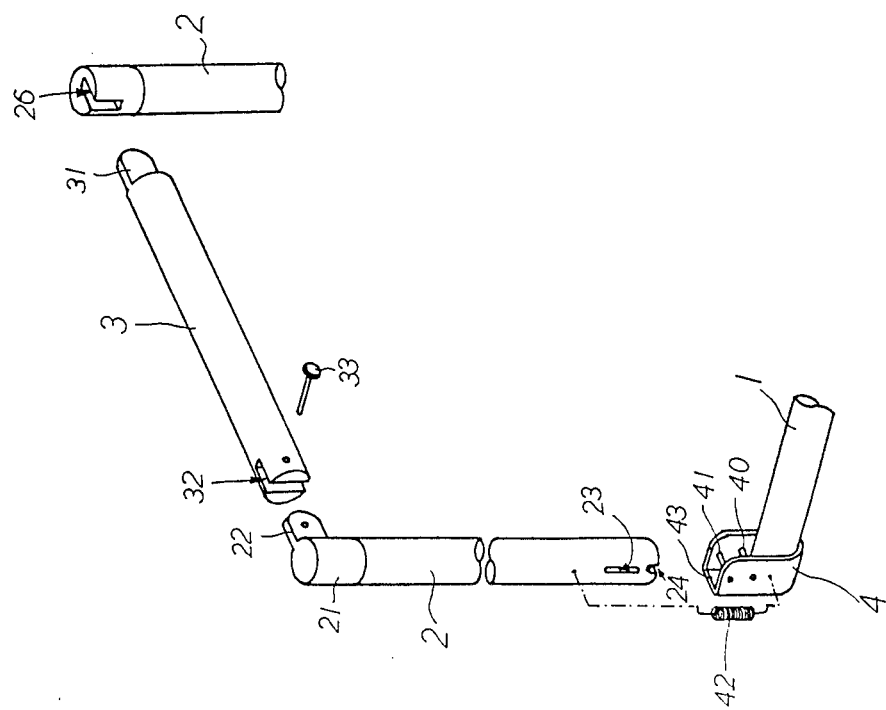
FIG. 2 is a fragmented, exploded view of primary components of the cart of FIG. 1.

As best shown in FIG. 1, the luggage cart of the instant invention includes a carrier portion on which the luggage is to be placed which includes a pair of tracks or support rods 1,1, joined together by a pair of hinged joints 11. Between the ends, each of the track rods 1,1, is provided with a pair of casters 10,10, spaced substantially equally with respect to track rods 1,1, and located adjacent the front end and rear end of rods 1,1, respectively. Stop blocks 12, 12, are mounted on rods 1,1, adjacent the pivot connection of hinge joints 11, 11, to rods 1,1, respectively, for positioning and limiting the pivotal motion of hinge joints 11, 11,. Thus, as best shown in FIG. 1, joints 11, 11, are folded toward each other when the cart is folded. The push rods and handle in the cart of the instant invention includes a pair of vertical rods 2,2, joined together by a pair of hinged joints 20,20, pivoted to rods 2,2, at spaced points. Stop blocks 25, 25, are mounted on rods 2,2, adjacent the pivots of joints 20,20, for positioning and limiting the pivotal motion of hinge joints 20. As best shown in FIG. 2, handle 3 is pivotally connected at one of its ends by slot 32, projection 22 and rivet pin 33 to mounting body 21, rotatably mounted on the end of vertical rod 2. At its opposite end, handle 3 has a projection 31 for engagement in slot 26 on vertical rod 2. At their bottom or lower ends, vertical rods 2,2, are connected, respectively, to the ends of tracks rods 1,1, by clamps 4,4. Clamps 4,4, are fixed to the ends of track rods 1,1, to project vertically upward from track rods 1,1. The open upward end of each clamp 4, has a U-shape with a vertical rear wall 43, and vertically spaced pins 40, 41. Pin 40 engages slot 24 in the end of vertical rod 2, and pin 41 passes through slot 23, FIG. 2, in vertical rod 2. For purposes more apparent later herein, spring 42 is connected at one of its ends to vertical rod 2, and at its opposite end to clamp 4 to urge the end of rod 2 into clamp 4.

With the cart of the instant invention folded, as shown in FIG. 4, to unfold and erect the cart for use, track or support rods 1,1, and vertical rods 2,2, are spread outwardly by opening hinged joints 11, 11, and 20, 20, against blocks 12, 12, and 25, 25, respectively. Vertical rods 2, 2, are pulled outwardly to extend springs 42, 42, FIG. 2, and disengage the end of vertical rods 2,2, and rear walls 43, 43, of clamps 4. With the springs extended and the rear walls disengaged, vertical rods 2, 2, are pivoted upwardly around pin 41 until the back of rods, 2, 2, engage walls 43, 43, and rods 2, 2, are then released. Springs 42, 42, draw rods 2, 2, downward to engage slots 24, 24, on rods 2, 2, with pins 40, 40. The vertical rods 2, 2, with slots 24, 24 engaged with pins 40, 40, are thus locked in vertical position, i.e. perpendicular to support rods 1, 1. Handle 3 is pivoted upward about rivet pin 33 in projection 22 and mounting body 21 is rotated, if necessary, to align projection 31 of arm 3 with slot 26 on vertical arm 2. Projection 31 of arm 3 is engaged in slot 26, and the cart is ready for use. As best shown in FIG. 3, suitcases or boxes to be carted are placed on tracks or support rods 1, 1. Smaller boxes, if they are to be carted, are placed on the top of the uppermost suitcase.

With suitcases or boxes on the unfolded and erected cart, the suitcases and boxes are easily moved from place to place by pushing or pulling the cart with handle 3. When the suitcase and boxes are removed, the cart can be easily folded for carrying and storage by reversing the procedure followed in unfolding and erecting. Both in use and in carrying and storage a convenient and handy luggage cart is provided.

The terms and expressions which have been employed in the foregoing description are used as terms of description and not of limitation, and there is no intention, in the use of such terms and expressions, of excluding any equivalents of the feature shown and described or portions thereof, but it is recognized that various modifications are possible within the scope of the invention claimed.

I claim:

1. A portable and foldable luggage cart comprising a pair of track rods, each track rod having a plurality of casters, a pair of vertical rods, means on one end of each of said track rods for pivotally mounting one end of one of said vertical rods to said one end of said each track rods, a handle pivotally connected at one of its ends to the free end of one of said vertical rods and having a projection at the other of its ends for engagement in a slot in the free end of the other of said vertical rods when said luggage cart is unfolded and erected for carrying luggage, hinged joints interconnecting said pair of track rods and said pair of vertical rods for spacing one of said track rods and vertical rods parallel to the other of said track and vertical rods when said hinged joints are opened for said cart to carry luggage, and for bringing said one and said other of said tracks together substantially close and parallel with each other when said hinged joints are closed for folding said cart, said pivotally mounting means on one end of each of said tracks having an open upward U-shaped end having a first pin extending through an elongated slot in said vertical rod, a second pin for engaging a slot in the end of said vertical rod when said vertical rod is perpendicular to said track rod, said open upward U-shaped end having a rear wall for engaging the slotted end of said vertical rod when said vertical rod is folded and for engaging the side of said rod when said slot is in engagement with said second pin, and a spring connected at one of its ends to said mounting means and at its other end to said vertical rod for engaging the slotted end of said vertical rod with said rear wall of said open U-shaped end when said vertical rod is folded and for engaging said slot in the end of said vertical wall with said second pin when said vertical rod is perpendicular to said track rod.

* * * * *